United States Patent
Lee et al.

(10) Patent No.: US 7,366,087 B2
(45) Date of Patent: Apr. 29, 2008

(54) DELTA-PREDICTED FREQUENCY OFFSET COMPENSATION APPARATUS AND METHOD THEREOF

(75) Inventors: Ju Hyun Lee, Daejon (KR); Myung Sin Kwark, Daejon (KR); Nak Woong Eum, Daejon (KR); Jong Dae Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1033 days.

(21) Appl. No.: 10/334,353

(22) Filed: Dec. 31, 2002

(65) Prior Publication Data
US 2004/0120248 A1    Jun. 24, 2004

(30) Foreign Application Priority Data
Dec. 18, 2002    (KR) .................... 10-2002-0081444

(51) Int. Cl.
*H04J 11/00* (2006.01)
*H03D 1/04* (2006.01)

(52) U.S. Cl. .................... 370/203; 370/206; 370/208; 375/346

(58) Field of Classification Search ................ 375/316, 375/326, 346; 370/203–210; 329/304, 306, 329/307
See application file for complete search history.

(56) References Cited

U.S. PATENT DOCUMENTS 5,970,397 A    10/1999   Klank et al.
6,647,025 B1 *  11/2003   Sudo ...................... 370/503

(Continued)

FOREIGN PATENT DOCUMENTS

| EP | 001195961 A2 * | 10/2002 |
|---|---|---|
| JP | 05-207088 | 8/1993 |
| JP | 10-290208 | 10/1998 |
| KR | 10-1998-0035453 | 8/1998 |
| KR | 102002001 | 8/2000 |

OTHER PUBLICATIONS

IEEE Transactions on Communications, vol. 42, No. 10, Oct. 1994, pp. 2908-2914, "A Technique for Orthogonal Frequency Division Multiplexing Frequency Offset Correction", Paul H. Moore.
0-7803-2742-X, 1995 IEEE, pp. 804-809, "A New Frequency Detector for Orthogonal Multicarrier Transmission Technique", Daffard et. al.

*Primary Examiner*—Chi Pham
*Assistant Examiner*—Tri H. Phan
(74) *Attorney, Agent, or Firm*—Blakley, Sokoloff, Taylor & Zafman LLP

(57) ABSTRACT

Provided are delta-predicted frequency offset compensation apparatus and method that estimates an offset delta of forthcoming symbols by using a principle that the offset delta of a symbol in a previous section is almost the same as an offset delta of some forthcoming symbols. The offset compensation method of the present research includes the steps of: a) estimating a frequency offset of a communication system based on an estimation period and estimation algorithm; b) outputting a compensation value for offset compensation through a feedback loop by considering the frequency offset value estimated based on the estimation period and the frequency offset delta estimated based on the estimation period and delay interval; and c) shifting the phase of a signal by as much as the offset corresponding to an input signal of the communication system to compensate the symbol for the frequency offset. The apparatus and method of the present invention can be applied to a communication system using an orthogonal frequency division multiplexing.

8 Claims, 10 Drawing Sheets

U.S. PATENT DOCUMENTS 6,658,063 B1 * 12/2003 Mizoguchi et al. ......... 375/260
7,116,741 B2 * 10/2006 Duncan et al. ............. 375/355
2003/0128754 A1 * 7/2003 Vandenameele-Lepla ... 375/229
2004/0071234 A1 * 4/2004 Li ............................. 375/341

* cited by examiner

US 7,366,087 B2

DELTA-PREDICTED FREQUENCY OFFSET COMPENSATION APPARATUS AND METHOD THEREOF

FIELD OF THE INVENTION

The present invention relates to a frequency offset compensation apparatus and a method thereof; and, more particularly, to apparatus and method for compensating a symbol for frequency offset, which is a problem in a receiver of a communication system, by using an orthogonal frequency division multiplexing (OFDM) method in which data are transmitted/received using a plurality of orthogonal sub-carrier waves.

DESCRIPTION OF RELATED ART

In an orthogonal frequency division multiplexing (OFDM) method, frequency offset is generated between a transmitter and a receiver due to the frequency difference between the oscillators of the transmitter and receiver, jitter of the oscillators, and the Doppler effect caused by the motion of the receiver. The frequency offset destroys the orthogonality between the sub-carrier waves and generates inter-channel interference (ICI) and inter-symbol interference (ISI). The ICI and ISI degrade the signal-to-noise ratio (SNR) of a signal, thus becoming a main factor for deteriorating the performance of the receiver. Accordingly, in the OFDM method, the frequency offset affects the performance of the entire system considerably.

Frequency offset compensation can be divided into two functions: One is to estimate the frequency offset included in a signal, and the other is to compensate for the frequency offset included in a signal by using an estimated offset. Generally, the functions of estimating and compensating for frequency offset is divided into a function with respect to a integral frequency offset which is integer-times as long as a sub-carrier wave interval, and a function with respect to a fractional frequency offset which is decimal-times as long as the sub-carrier wave interval.

In the OFDM method, a unit of data transmission, which is carried by a plurality of sub-carrier waves while maintaining the orthogonality, is referred to as a symbol. Generally, the change of frequency offset is tracked by estimating an integral frequency offset once in the initial stage when the receiver is operated or performing compensation at a period of tens to hundreds of symbols, and with respect to the fractional frequency offset which is used to perform estimation at every or a couple of symbols and making a compensation to each symbol.

It is optimal to apply the estimated frequency offset to a symbol, for which the estimation is performed. However, in an actual embodiment, the estimated frequency offset is fed back and applied to the next coming symbol, as shown in FIG. 1, considering the efficiency in an embodiment.

FIG. 1 is a block diagram showing a conventional frequency offset compensation circuit. When a frequency offset compensation circuit is embodied as shown in FIG. 1, feedback delay corresponding to the operation time of a fast Fourier Transform (FFT) and operation time of a block for estimating a frequency offset is generated, until the frequency offset is estimated in the symbol and the compensation value is fed back. Therefore, the estimated frequency offset is not compensated to the corresponding symbol, but compensated to a symbol that comes later as long as the feedback delay.

The frequency offset compensation method of the present invention can be effectively applied to a case where frequency offset is estimated and compensated for at every symbol or a couple of symbols and the OFDM. frequency offset estimation and compensation circuit having a feedback topology.

The frequency offset compensation method at a receiver that is commonly used in the conventional OFDM method is shown in FIG. 1.

A signal received in a radio frequency (RF) module 101 is moved into a pass-band, i.e. intermediate frequency band. Then, it is sampled in an analog-to-digital converter (ADC) 102 and converted into a base-band signal. From the base-band signal, a symbol data having a complex number is generated in an in-phase and quadrature-phase (IQ) splitting block 103, and as the complex number symbol data pass an automatic gain controlling (AGC) block 105, and the gain of the signal is controlled to prevent the overflow in a fast Fourier transform (FFT) block 106 in consideration of the internal operation bit width in the FFT block 106. Then, the data are transmitted to the FFT block 106 and the data of the respective sub-carrier waves are separated to demodulate the symbol. Subsequently, an error generated in the transmission process is corrected in a forward error correction (FEC) block 108, and the originally transmitted data is restored through a source decoding process in a source decoding block 109.

All the above processes can be performed only when the frequency offset is removed from the received signal. So, the frequency offset which was normalized in a sub-carrier wave should be estimated by using an input value or output value of the FFT 106 based on the kind of the estimation algorithm in a frequency offset estimating block 110, and then the estimated frequency offset is transmitted to a control block 111 to calculate the compensation value. In the control block 111, a compensation value is calculated using the estimated frequency offset value, and the obtained compensation value is fed back to a numerical value controlled oscillator (NCO) 112. The NCO 112 sends out sine and cosine signals to the phase rotator 104 to compensate for the frequency offset. The phase rotator 104 shifts the phase of the input signal as much as the frequency offset to perform compensation, using the signal obtained from the NCO 112.

Here, due to the delay caused by FFT operation time and the calculation time for frequency offset estimation, the symbol, for which the frequency offset is estimated, and the symbol that is actually compensated by using the estimated offset are different. Naturally, the offset values included in the two symbols are different. Therefore, there is a problem that the offset is not compensated for perfectly and remnant offset is generated.

In the conventional offset compensation method, compensation ($cmp_n$) value is expressed as shown in an equation 1. That is, the compensation ($cmp_n$) value is calculated based on the equation 1 by using the offset value ($est_n$) estimated in the control block 111 in the conventional offset compensation method.

$$CMP_n = \begin{cases} 0: & n \leq DELAY+1 \\ est_{n-1} + cmp_{n-1-DELAY}: & \text{otherwise } n = 1, 2, 3, \ldots \end{cases} \quad \text{Eq. 1}$$

wherein $est_n$: frequency offset estimated by using an n-DELAY_th symbol;

$cmp_n$: a compensation value actually applied to an n_th symbol to compensate for the frequency offset;

n: index of a symbol (n=1,2, . . . );

$e_n$: frequency offset of an n_th symbol;

$S_n$: an n_th data symbol; and

DELAY: the delay taken for estimating the offset value of a symbol (the number of symbols).

The offset value of the estimated symbol is compensated for on a symbol basis, and a determined offset value is applied to the very next symbol to perform compensation (Feedback delay=DELAY+1).

In the equation 1, the compensation value is initialized at '0' for the DELAY+1 number of symbols, until the initial estimation value is fed back. For the symbols that come after the DELAY+1 number of symbols, the compensation value is expressed as the summation of the estimated value ($est_n$) and the value compensated to the symbol (i.e., n-DELAY−1_th symbol) that has estimated the value.

FIG. 2 is an exemplary diagram illustrating a frequency offset compensation in a conventional frequency offset compensation method. When compensation is performed in the conventional compensation method, the result as shown in FIG. 2 is obtained. According to the conventional method shown in FIG. 2, we assume the feedback delay is three symbols, and offset is estimated and compensated for at every symbol.

From FIG. 2, it can be seen that the compensation value of an arbitrary symbol $S_n$ is the offset ($e_n$) of an n-DELAY−1_th symbol.

Then, the compensation value ($cmp_n$) compensates for the offset ($e_n$) in the original signal after making a movement as many symbols as DELAY+1. So, the frequency offset that is changed during the DELAY+1 number of symbols remains as remnant offset in the symbol. Although the frequency offset estimation is performed perfectly, remnant offset is generated due to the feedback delay, because the frequent offset cannot be compensated for perfectly. Thus, the performance of the receiver is affected adversely. This adverse influence is shown in the simulated result of FIG. 3.

FIG. 3 is an exemplary graph showing the generation of remnant offset due to feedback delay, when the conventional frequency offset compensation method is applied (Feedback delay=DELAY+1, DELAY=2, PERIOD=1).

The drawing shows a result of applying the conventional method to a received signal that includes a frequency offset having a form of cosine, while the estimation delay time is varied to 0, 2, 4. Here, the input frequency offset is determined to have a cosine form varying from −0.5 to 0.5, considering that the estimation range of the most fractional frequency offset estimation algorithm is from −0.5 to 0.5. As shown in the simulated result, the remnant offset is increased, as the delay is raised. Also, the compensation value ($cmp_n$) is maintained to have the same form of the frequency offset and compensated to a symbol that comes after DELAY+1 number of symbols.

In the conventional offset compensation method, since the offset is estimated and compensated for at every symbol or a couple of symbols, the operation time based on a unit time becomes long, and the power is consumed a lot. In addition, due to the large amount of calculation, a high-performance processor is required when the offset is estimated using a processor. When the offset is estimated and compensated based on a couple of symbols in the conventional offset compensation method, once an offset is estimated, symbols are compensated with the same value estimated from a previous symbol continuously, until a new offset is estimated from a symbol of the next period. Therefore, it is impossible to compensate the symbols in the estimation period for the changing frequency offset. The frequency offset that is changed during the symbols in the estimation period cannot perform compensation and remains as remnant offset, until a new frequency offset is estimated and the frequency offset compensation is performed.

FIG. 4 is an exemplary graph showing the remnant offset being accumulated, when a concept of estimation period is applied to the conventional frequency offset compensation method (DELAY=2, PERIOD=10).

In the drawing, the symbols from the n=A to the n=B are compensated with an offset value estimated in the n=A-DELAY−1 symbol. The actual frequency offset is changed each symbol, but the conventional method has no consideration for the symbol-based change in the frequency offset. So, all the input frequency offset changes are accumulated as remnant offset. Therefore, the remnant offset is increased in proportion to the change amount of the frequency offset in the section from the n=A to n=B, which is shown in FIG. 4. When the estimation period is increased as above, the offsets for the symbols in the estimation periods are accumulated for a long time, thus causing a problem that the amount of remnant offset remaining in a symbol is increased, too.

SUMMARY OF THE INVENTION

It is, therefore, an object of the present invention to provide a delta-predicted frequency offset compensation apparatus that estimates the amount of change, i.e., delta, of the forthcoming frequency offset by using a principle that the offset delta of the symbols in a predetermined previous section is almost the same as the offset delta of some forthcoming symbols, and a method thereof.

In accordance with an aspect of the present invention, there is provided a delta-predicted frequency offset compensation apparatus applied to a communication system which uses an orthogonal frequency division multiplexing (OFDM) using a plurality of orthogonal sub-carrier waves, including: an offset estimating means for receiving a signal from the communication system based on an estimation period and estimation algorithm and estimating the frequency offset which is normalized in the sub-carrier wave; a feedback controlling means for outputting a compensation value for offset compensation through a feedback loop by considering the frequency offset value estimated from the offset estimating means based on the estimation period, and the frequency offset delta estimated based on the estimation period and delay interval, and; an offset compensation signal outputting means for outputting an offset compensation signal having a form of sine and cosine based on the compensation value transmitted from the feedback controlling means; and a phase rotating means for shifting the phase of the signal inputted to the communication system with the offset compensation signal outputted from the offset compensation signal outputting means by as much as the offset corresponding to the input signal to compensate the symbol for the offset.

In accordance with another aspect of the present invention, there is provided a delta-predicted frequency offset compensation method applied to a delta-predicted frequency offset compensation apparatus, including the steps of: a) estimating a frequency offset of a communication system based on an estimation period and estimation algorithm; b) outputting a compensation value for offset compensation through a feedback loop by considering the frequency offset value estimated based on the estimation period and the frequency offset delta estimated based on the estimation period and delay interval; and c) shifting the phase of a signal by as much as the offset corresponding to an input signal of the communication system to compensate the symbol for the frequency offset.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 5:
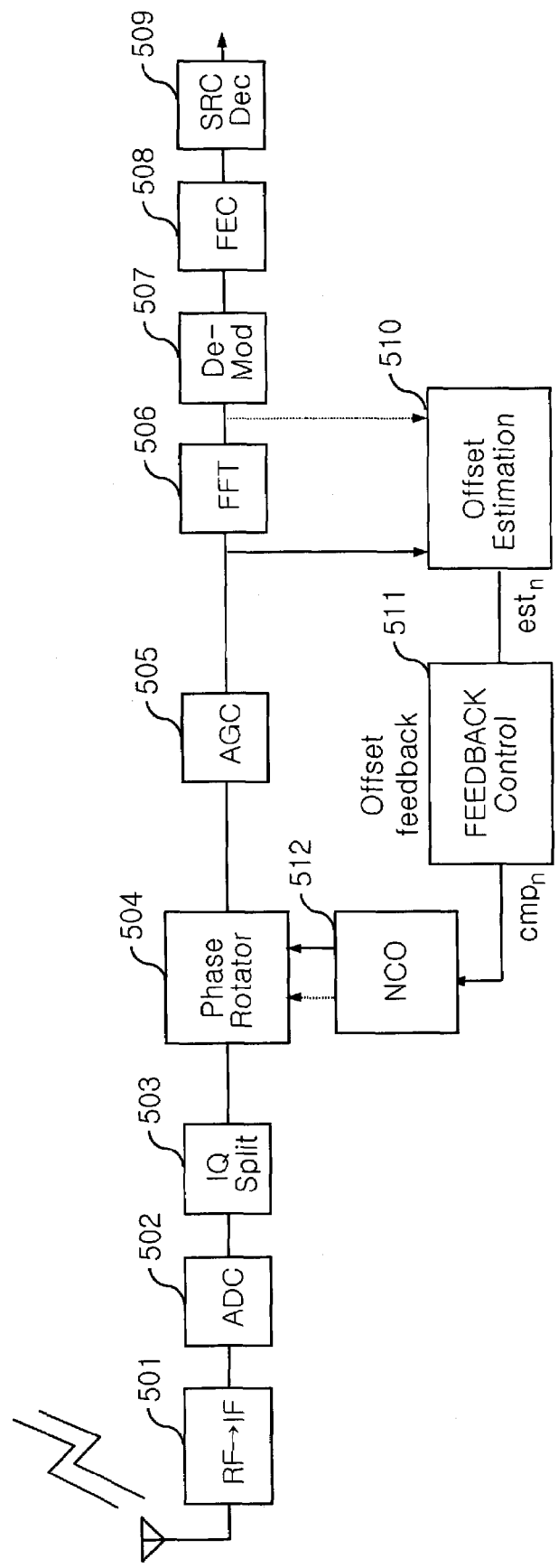
FIG. 5 is a block diagram describing a structure of a delta-predicted frequency offset compensation apparatus in accordance with an embodiment of the present invention.

FIG. 5 is a block diagram describing a structure of a delta-predicted frequency offset compensation apparatus in accordance with an embodiment of the present invention.

In the delta-predicted frequency offset compensation apparatus of the present invention, a feedback controlling block 511 adopting a new algorithm of FIG. 5 is added to a conventional frequency offset compensation apparatus. The feedback control block 511 generates and outputs a compensation value ($cmp_n$) to be applied to the actual compensation by using a frequency offset ($est_n$) value estimated in an offset estimating block 510, and transmits the compensation value to a numerical value controlled oscillator (NCO) 512. A phase rotator 504 performs compensation for the frequency offset by shifting the phase of a signal, using the value outputted from the NCO 512.

The compensation value ($cmp_n$) that is actually applied to the compensation is obtained by the feedback control block 511. The operation is performed as shown in Eq. 2.

$$\varepsilon_n = \begin{cases} 0, & n \leq DELAY + 1 \\ est_{n-1} + cmp_{n-DELAY-1}, ((n-1))_{PERIOD=0} \\ \varepsilon_{n-1}, ((n-1))_{PERIOD=0} \end{cases}, \quad n > DELAY + 1 \qquad \text{Eq. 2}$$

$$delta_n = \begin{cases} \dfrac{\varepsilon_n - \varepsilon_{n-PERIOD}}{PERIOD}, ((n-1))_{PERIOD=0} \\ delta_{n-1}, ((n-1))_{PERIOD=0} \end{cases}, \quad \begin{array}{l} n > DELAY + 1 + PERIOD \\ 0, n \leq DELAY + 1 + PERIOD \end{array}$$

$$cmp_n = \begin{cases} \varepsilon_n + delta_n \cdot (DELAY + 1), & ((n-1))_{PERIOD} = 0 \\ cmp_{n-1} + \delta_n, & ((n-1))_{PERIOD} \neq 0 \end{cases}$$

wherein $est_n$: frequency offset estimated in an n-DELAY_th symbol;

$cmp_n$: a compensation value actually applied to an n_th symbol;

n: index of a symbol (n=1,2, . . . ); and $S_n$: an n_th data symbol.

Figure 6:
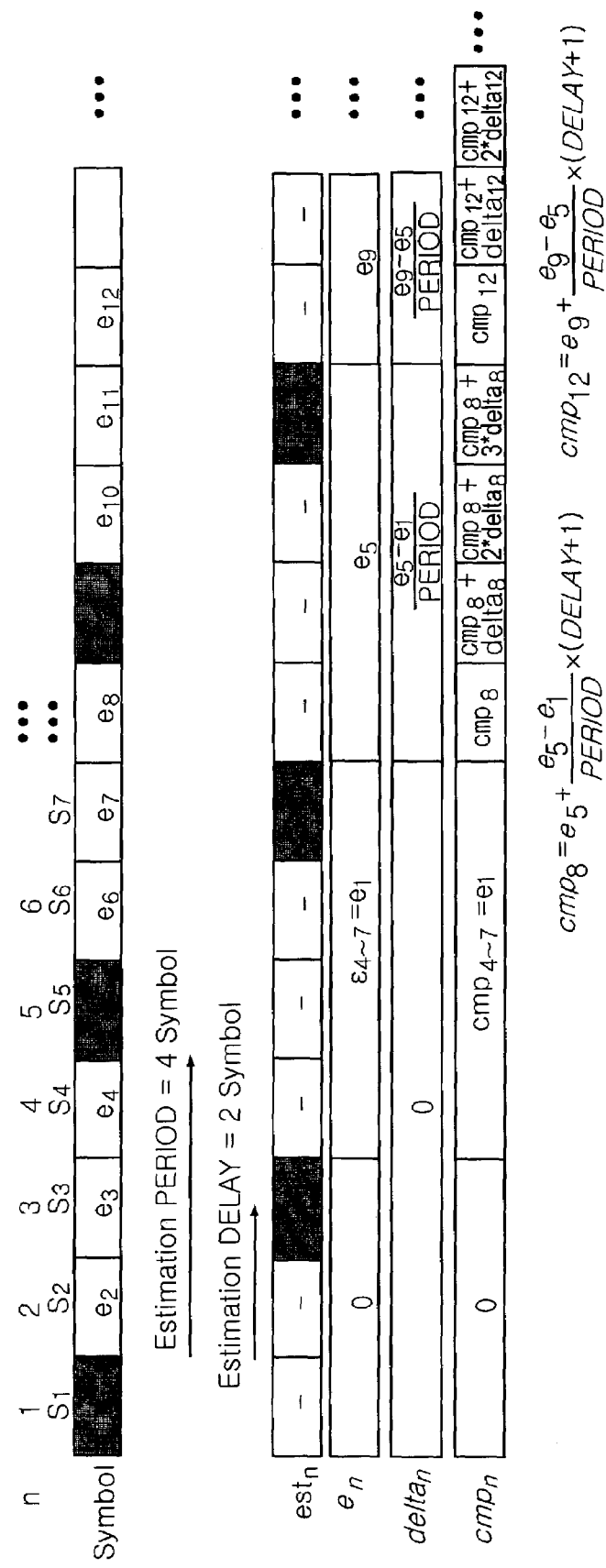
FIG. 6 an exemplary diagram illustrating a frequency offset compensation in a delta-predicted frequency offset compensation method in accordance with the embodiment of the present invention.

Based on the equation 2, an example of the operation of the frequency offset compensation method suggested in the present invention is shown in FIG. 6.

FIG. 6 an exemplary diagram illustrating a frequency offset compensation in a delta-predicted frequency offset compensation method in accordance with the embodiment of the present invention.

Figure 1:
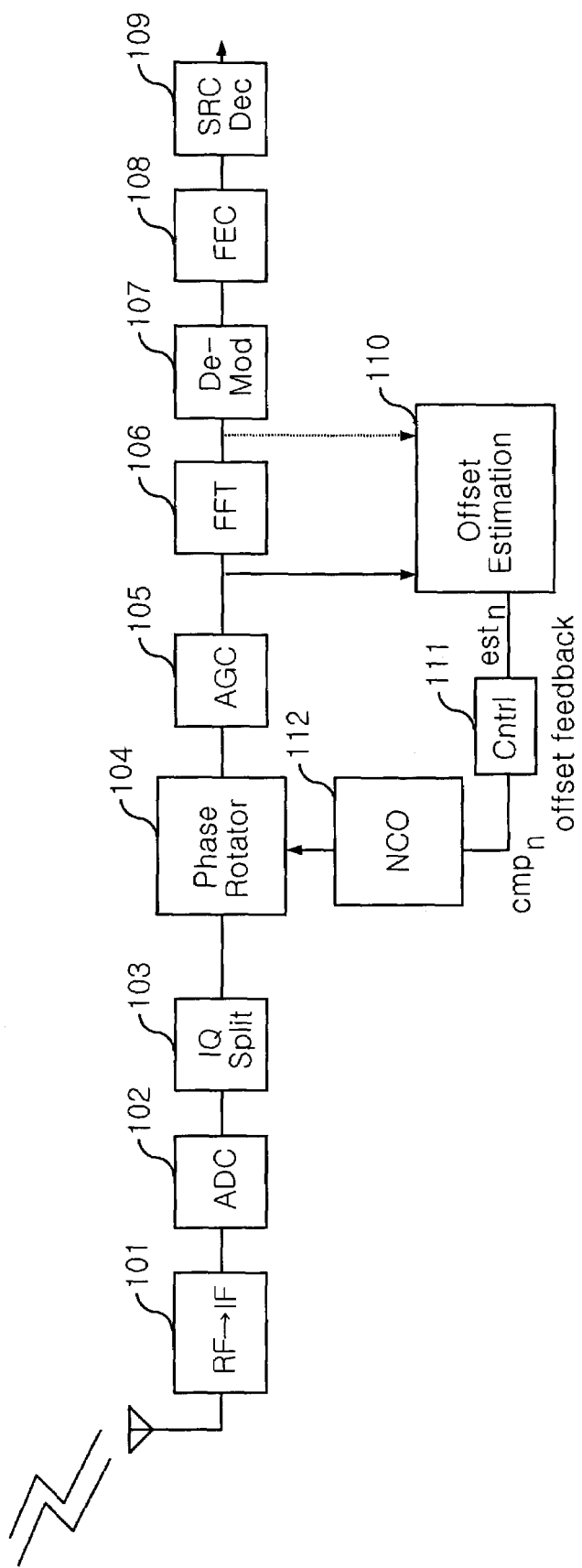
FIG. 1 is a block diagram showing a conventional frequency offset compensation circuit.
Figure 2:
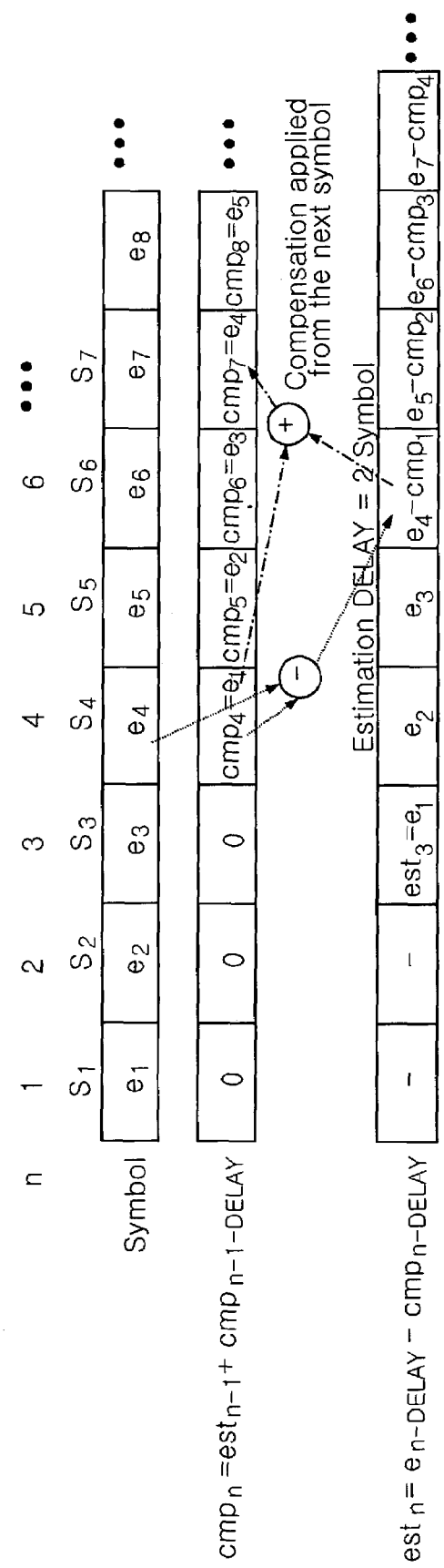
FIG. 2 is an exemplary diagram illustrating a frequency offset compensation in a conventional frequency offset compensation method.
Figure 3:
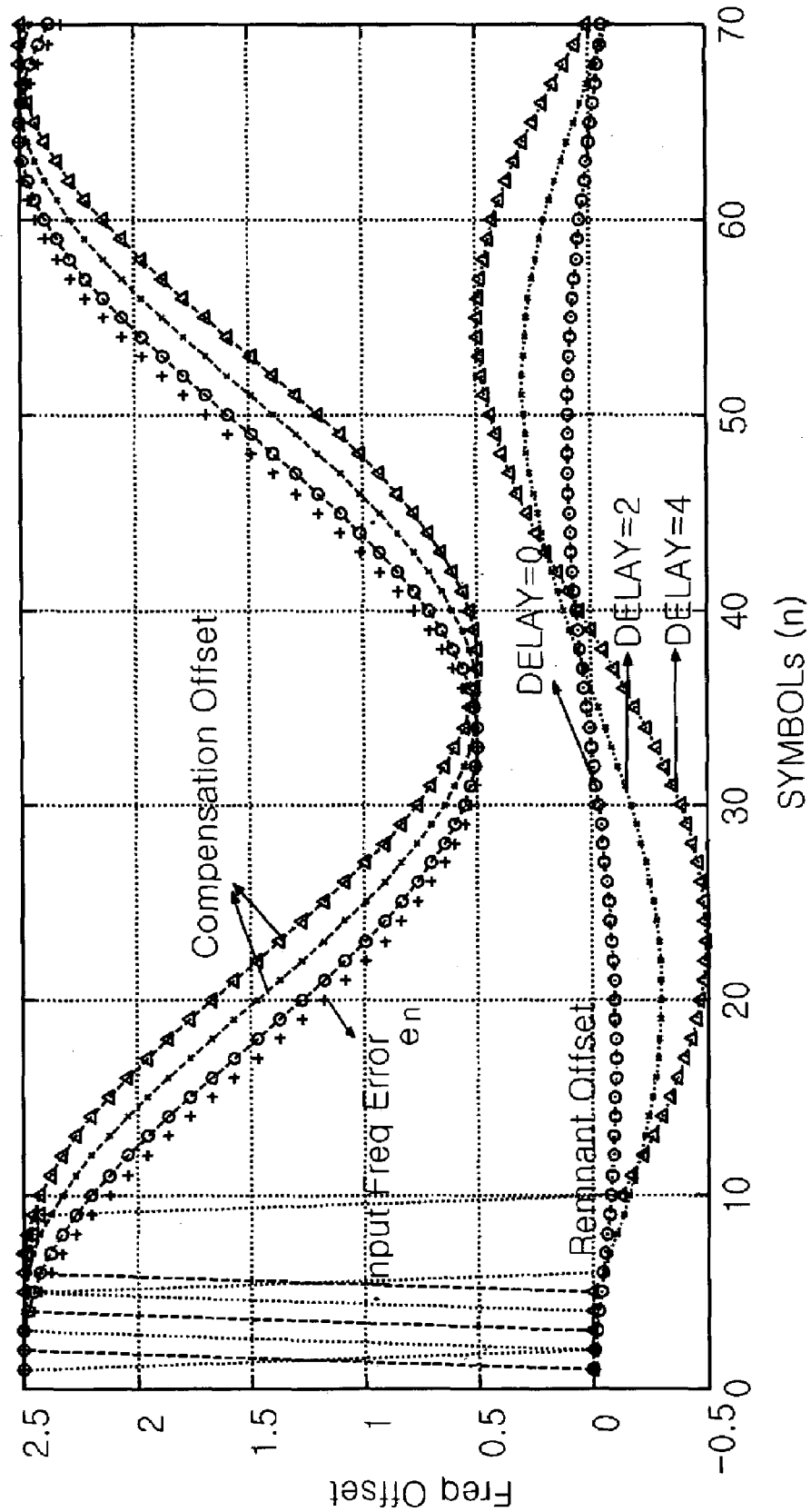
FIG. 3 is an exemplary graph showing a generation of remnant offset depending on feedback delay when the conventional frequency offset compensation method is applied.

When the compensation method of the present invention is applied, the offset compensation diagram of FIG. 6 shows that the offset estimation delay and the feedback delay are two and three symbols, respectively, and the frequency offset is estimated and compensated for once every four symbols. Differently from FIG. 2, the compensation value ($cmp_n$) is changed continuously even in a section where the frequency offset is not estimated, and the difference between the compensation value and the offset ($e_n$) included in the actually compensated symbol is less than that of FIG. 2.

To describe the operation of the compensation method suggested in the present invention, following points are assumed.

The period where the offset of the symbols is estimated is referred to as an estimation period. That is, if the estimation period is 4, the offset estimation is performed once every four symbols to obtain a new delta value.

The delay time taken for an offset estimation block 510 to estimate and output an offset ($est_n$) value by using the symbol is referred to as estimation delay. The estimation delay is expressed as the number of symbols.

The estimated offset ($est_n$) is applied to a symbol right next to the symbol, for which the frequency offset is estimated in a feedback controlling block 511, for compensation. That is, the operation of the feedback control block 512 is completed before the beginning point of the consecutive symbols that come after the offset ($est_n$) value is outputted, and then the compensation value ($cmp_n$) is outputted. Therefore, the delay by the entire feedback can be thought to be 'estimation delay+1'.

Noise effect is not considered.

It is assumed that the algorithm estimating the frequency offset included in a symbol could estimate the difference between the offset of the symbol and the compensation value precisely.

The meaning of the values shown in the equation 2 is described. The compensation method of the present invention can be understood by figuring out the meaning of the values in the equation 2.

$\epsilon_n$ is a summation of the difference ($est_n$) between the frequency error ($e_{n-DELAY-1}$) value in the actual symbol and the value ($cmp_{n-DELAY-1}$) compensated to the symbol, and the value ($cmp_n$) compensated to the symbol. Therefore, $\epsilon_n$ means the frequency error value ($e_{n-DELAY-1}$) which is actually included in the n-DELAY-1_th symbol.

Since the value of n corresponds to an estimation period, the value of $\epsilon_n$ can have the meaning mentioned above, when the frequency offset estimated newly with respect to the n-DELAY-1_th symbol. In other cases, the previous value ($\epsilon_{n-1}$) continues to be used, even though it is updated into a new value, and during the section of the initial DELAY+1 number of symbols, it is initialized at 0.

The numerator ($\epsilon_n - \epsilon_{n-PERIOD}$) of the delta$_n$ value in the equation 2 is expressed as the difference between the $\epsilon_n$ value and the $\epsilon_{n-PERIOD}$, which means the delta during the estimation period of the $\epsilon_n$ value. As mentioned above, since the $\epsilon_n$ value denotes the actual frequency offset of the n-DELAY-1_th symbol, the numerator of the delta$_n$ value is the frequency offset difference between the n-DELAY-1_th symbol and the n-DELAY-1-PERIOD_th symbol, that is, the delta value of the frequency offset. Since delta$_n$ is obtained by dividing the delta value by the estimation period, the delta$_n$ value is the delta value of the frequency offset that is changed each symbol.

Here, the delta$_n$ value can have the meaning mentioned above, when the n value corresponds to the estimation period and a new offset estimation is performed with respect to an n-DELAY-1_th symbol. The delta$_n$ value is updated into a newly estimated value once every offset estimation period. Except the case, it keeps the previous value (delta$_{n-1}$), and during the initial 'n-1-DELAY-PERIOD' number of symbols, it is initialized at 0. Since the delta$_n$ value requires an 'n-1-DELAY-PERIOD'_th symbol (that is, offset estimation should be performed at least once before), it should be initialized into 0 at least during the initial PERIOD+DELAY+1 number of symbols.

If the frequency offset is increased or decreased very slowly or monotonously, compared to the symbol rate and thus the delta between the 'n-DELAY-1'_th symbol and the 'n-DELAY-1-PERIOD'_th symbol is almost the same as the delta between the 'n-DELAY-1'_th symbol and the n_th symbol, the actual offset value ($e_n$) of the n_th symbol can be estimated in the following method by using the offset ($\epsilon_n$) value and the delta$_n$ value.

Since the $\epsilon_n$ value denotes the actual offset ($e_{n-1-DELAY}$) of the 'n-DELAY-1'_th symbol, if the delta$_n$ value that stands for the delta of the offset per a symbol is added to the $\epsilon_n$ value as many times as DELAY+1 that corresponds to the feedback delay, the frequency offset ($e_n$) value of the n_th symbol can be compensated precisely. This way, the influence from the feedback delay can be removed.

Once the delta$_n$ value is obtained, the period of the symbols does not correspond to the offset estimation period. So, the symbols whose offset is not estimated (i.e., symbols existing between the offset estimation periods) can be compensated for the offset precisely by adding the delta$_n$ value, which denotes the offset delta of each symbol, to the compensation ($cmp_n$) value which is applied to the preceding symbol of each symbol. The compensation ($cmp_n$) value can be obtained in the method described above, and the value is used for the actual compensation.

Just as the offset ($\epsilon_n$) value, the compensation ($cmp_n$) value cannot have the estimation value of the offset during the initial DELAY+1 number of symbols. So, the compensation ($cmp_n$) value is initialized at 0. After the DELAY+1 number of symbols, the compensation ($cmp_n$) value is outputted in the method shown in the equation 2. That is, it is updated into a new value once every offset estimation period, and during a section between the symbol periods, the change of the frequency offset is tracked and compensated by adding the delta$_n$ value to the preceding compensation ($cmp_{n-1}$) value.

The effect from the remnant offset which is caused by the feedback delay can be eliminated by obtaining the compensation ($cmp_n$) value through the method of the present invention. Since the symbols between the offset estimation periods can be compensated for the offset almost exactly, the accumulation of the offset that can happen when the symbols between the estimation periods are compensated with a previous estimation value, can be prevented. Since the offset estimation period can be extended, the power consumption and the amount of calculation can be reduced.

As described before, in the method suggested in the present invention, the frequency offset makes a monotonous increase or decrease very slowly, compared to the symbol rate. So, when the delta between the 'n-DELAY-1'_th symbol and the 'n-DELAY-1-PERIOD'_th symbol is almost the same as the delta between the 'n-DELAY-1'_th symbol and the n_th symbol (that is, when the frequency offset is increased or decreased linearly), the frequency offset becomes very close to the actual frequency offset. The simulated result of this case is shown in FIG. 7.

Figure 7:
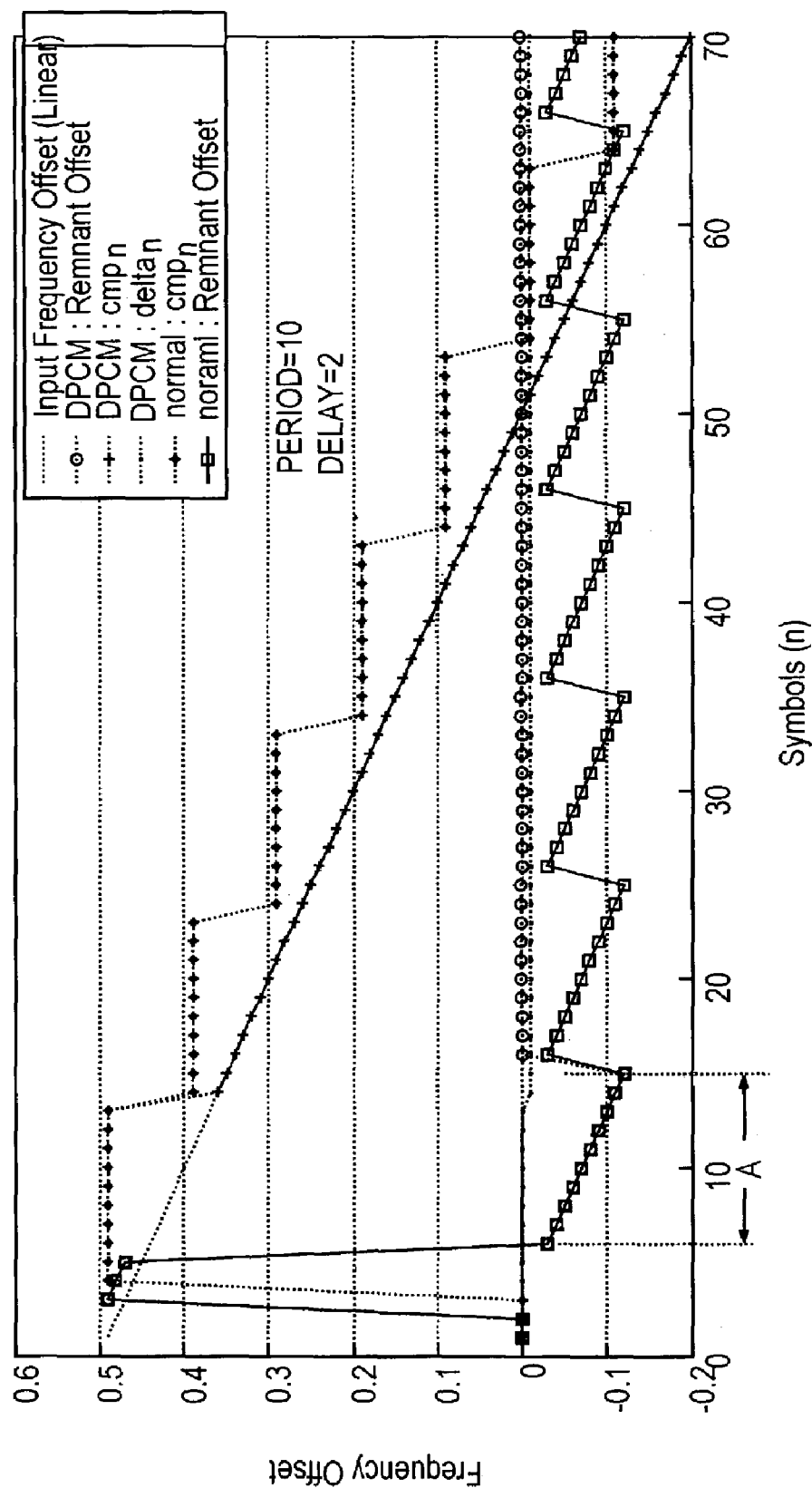
FIG. 7 is an exemplary graph comparing the performance of the delta-predicted frequency offset compensation method of the present invention and the conventional frequency offset compensation method with respect to input frequency offset that is changed linearly.

FIG. 7 is an exemplary graph comparing the performance of the delta-predicted frequency offset compensation method of the present invention and the conventional frequency offset compensation method with respect to input frequency offset that is changed linearly (DELAY=2, PERIOD=10).

The delta-predicted frequency offset compensation method (DPCM) of the present invention has the characteristics in the equation 2.

Referring to FIG. 7, when the DPCM of the present invention is used, the remnant offset (DPCM: Remnant_Offset) does not appear at all. This means that the symbol is not affected by the feedback delay. Of course, in this case, although the offset estimation period is extended, no remnant offset is accumulated in the symbols.

However, when the frequency offset compensation is performed in the conventional method, remnant offset is generated in proportion to the size of the feedback delay. Also, when an estimation period is applied and the offset is estimated and compensated for once every ten symbols, the symbols between the estimation periods, such as the section A, have accumulated remnant offset, which is incased in the same proportion to the input frequency offset.

Figure 8:
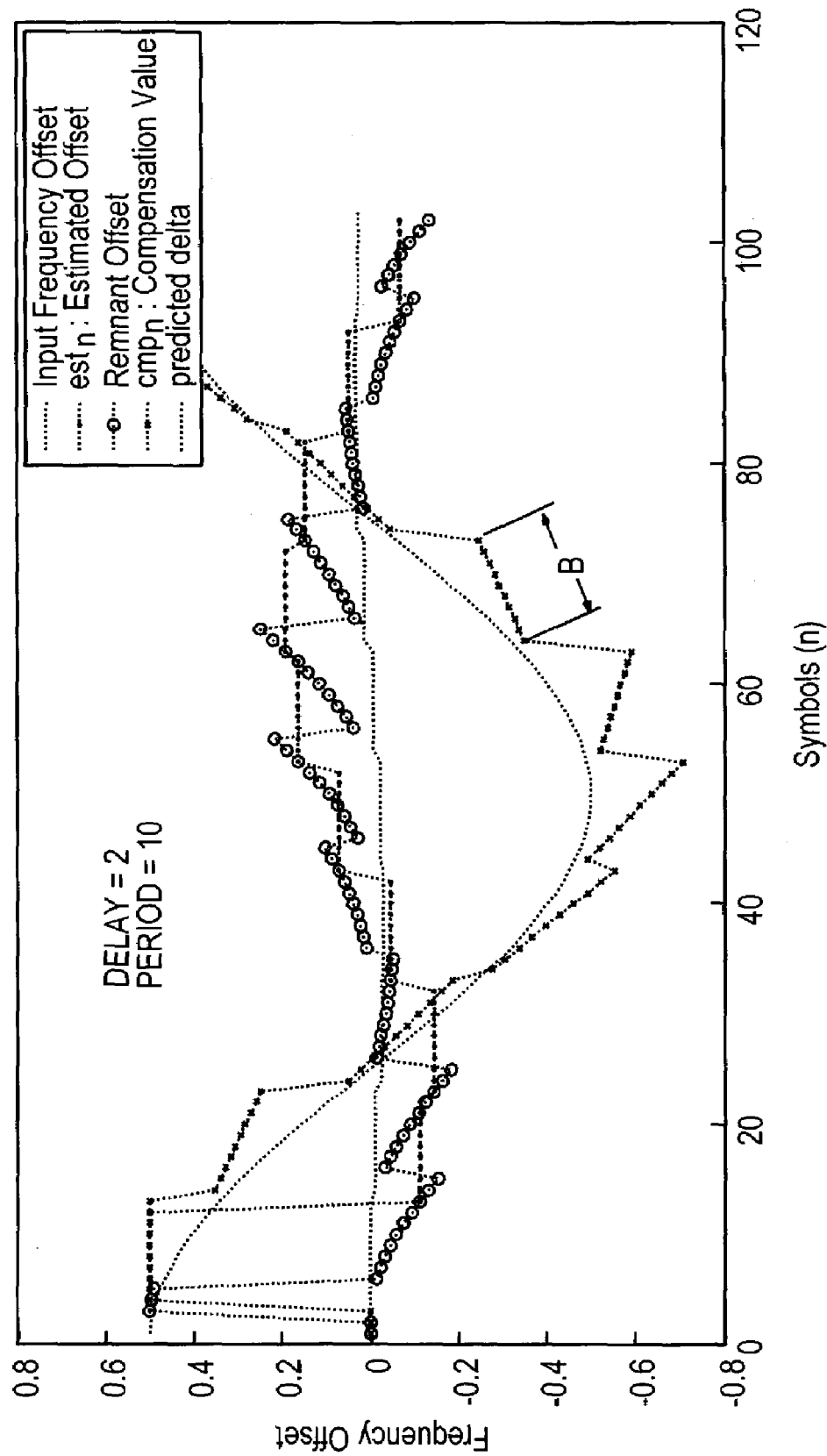
FIG. 8 is a graph showing the remnant offset when the delta-predicted frequency offset compensation method is applied in accordance with the present invention.

FIG. 8 is a graph showing the remnant offset when the delta-predicted frequency offset compensation method is applied in accordance with the present invention (DELAY=2, PERIOD=10, Input Offset=0.5 cos (2πn/100)).

Figure 4:
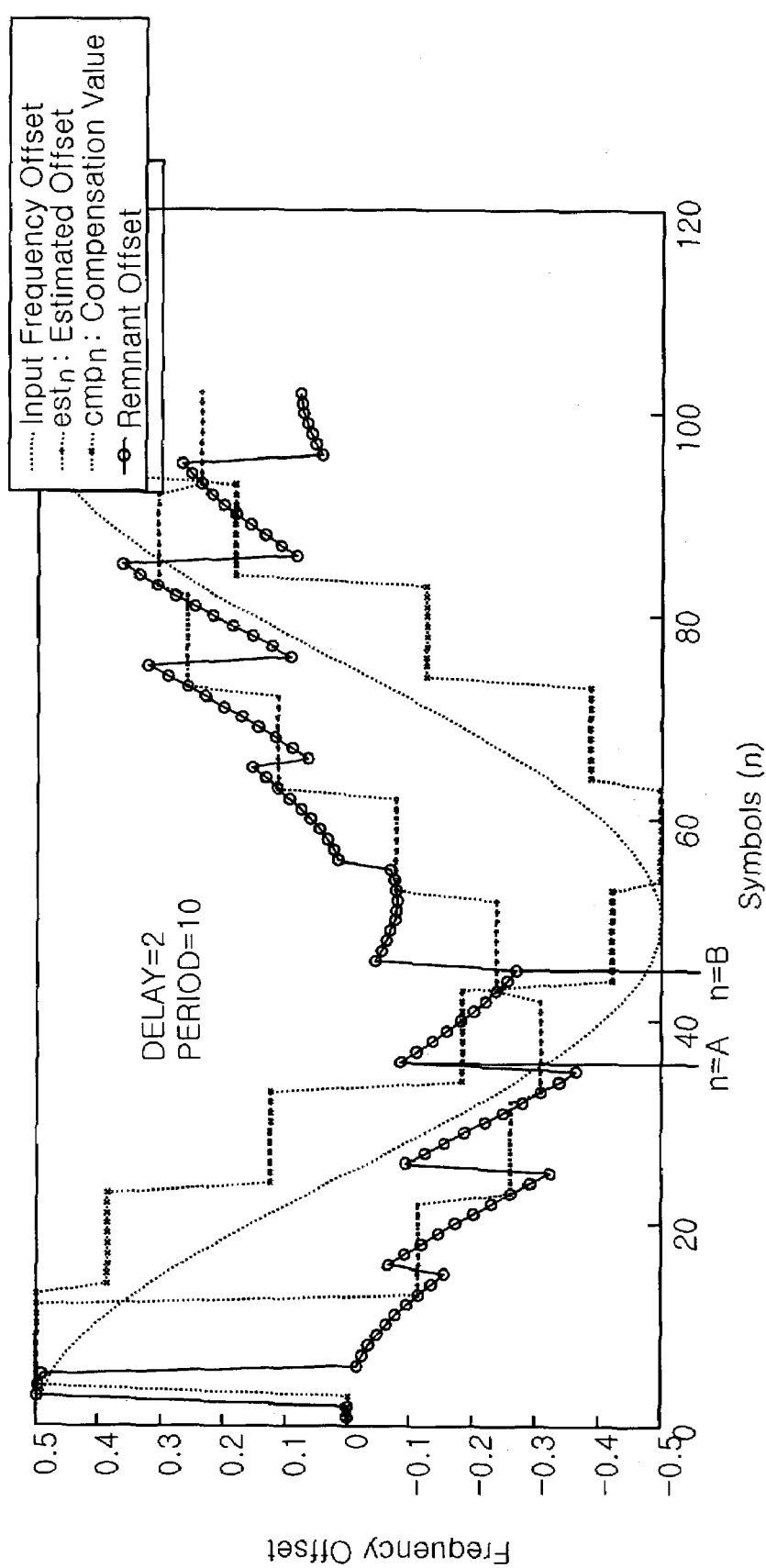
FIG. 4 is an exemplary graph showing the remnant offset being accumulated when a concept of estimation period is applied to the conventional frequency offset compensation method.

The drawing shows a simulated result of a cosine-formed frequency offset that is changed rapidly with a period of 100 symbols and a range of −0.5 to 0.5. It also shows that the compensation ($cmp_n$) value continues to be changed and perform compensation according to the frequency offset of the input symbol even in a section where offset is not estimated (See B of FIG. 8), which is different from the compensation ($cmp_n$) value in a section between the n=A and the n=B when the conventional compensation method of FIG. 4 is used. By doing so, the accumulation of remnant offset can be reduced remarkably in the symbols between the offset estimation periods, compared to the conventional frequency offset compensation method.

Figure 9:
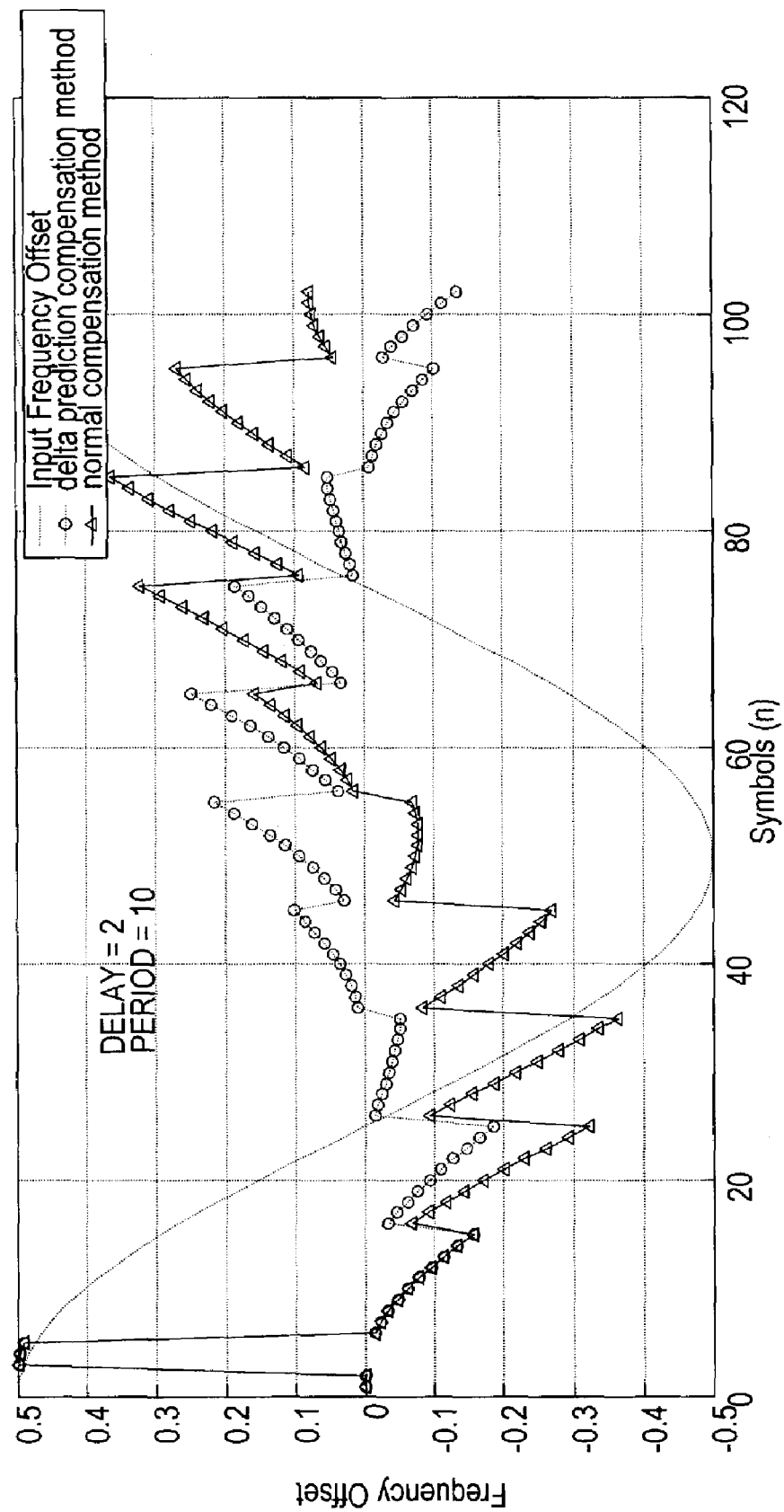
FIG. 9 is an exemplary graph comparing the remnant offset produced in the delta-predicted frequency offset compensation method of the present invention and the remnant offset produced in the conventional frequency offset compensation method.

FIG. 9 is an exemplary graph comparing the remnant offset produced in the delta-predicted frequency offset compensation method of the present invention and the remnant offset produced in the conventional frequency offset compensation method (DELAY=2, PERIOD=10, Input Offset=0.5).

In the method of the present invention, the remnant offset is produced less than that of the conventional method, because the delta of the frequency offset of the forthcoming symbols are estimated as a parameter $delta_n$ based on the actually measured delta of the frequency offset of the previous symbols and compensated for the frequency offset as much as the actually measured delta of the previous symbols. From FIG. 9, it can be seen that the entire size of the remnant offset produced in accordance with the method of the present invention is smaller than that of the conventional method. The input frequency offset of FIG. 9 has a cosine form having a period of 100 symbols. It can make a very fast change. However, in an actual case, the frequency offset could not be changed that fast, but very slowly. Therefore, the method of the present invention can be shown in a line and the compensation process can be performed more efficiently.

Figure 10:
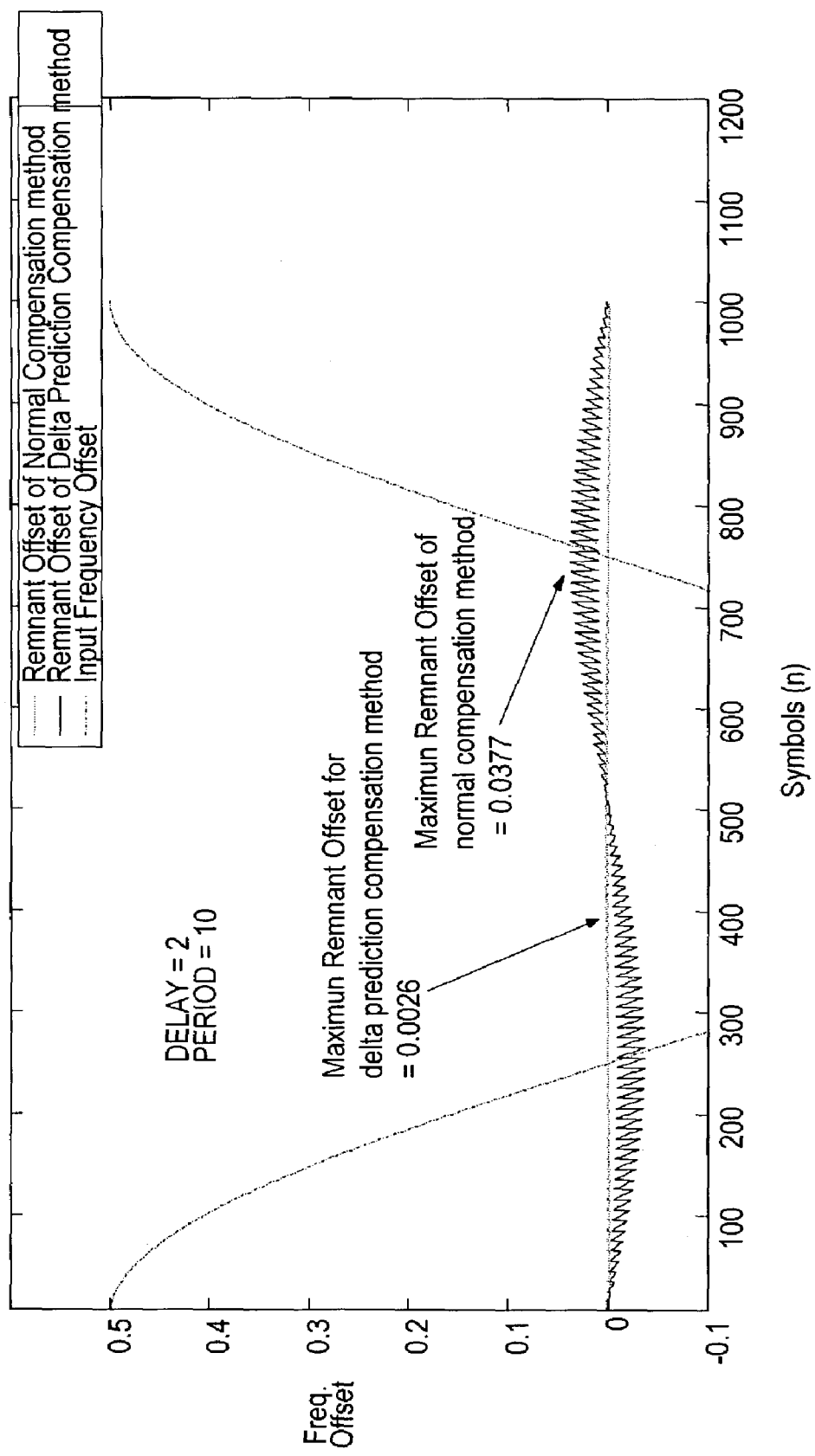
FIG. 10 is an exemplary graph comparing the remnant offset produced in the delta-predicted frequency offset compensation method of the present invention and the remnant offset produced in the conventional frequency offset compensation method, wherein the number of symbols are increased to be suitable to actual environment.

To show the above points more distinctively, a frequency offset that is changed at a period of approximately 1000 symbols is inputted, and the remnant offset obtained in accordance with the method of the present invention and in the conventional method is shown in the simulated result of FIG. 10.

FIG. 10 is an exemplary graph comparing the remnant offset produced in the delta-predicted frequency offset compensation method of the present invention and the remnant offset produced in the conventional frequency offset compensation method, wherein the number of symbols are increased to be suitable to actual environment (DELAY=2, PERIOD=10, Input Offset=0.5 cos (2πn/1000)).

The maximum sizes of the remnant offset obtained from the two methods are compared are 0.0026 and 0.0377. One is 15 times as big as the other. The difference is widened much more when the frequency offset is changed slowly, or when the length of the estimation period is extended. Since the actual frequency offset is changed far more slowly than the period inputted in the simulation, the frequency offset compensation method of the present invention can be used more efficiently.

When the signal-to-noise ratio (SNR) is deteriorated less than 0.1 dB due to the frequency offset, the influence from the frequency offset on the OFDM system is known to be negligible. However, in case of a quadrature phase shift keying (QPSK) system, it is known to be negligible if the frequency offset is less than 0.01 times of sub-carrier spacing. With respect to the frequency offset that is changed at a period as much as or more than the input frequency offset shown in FIG. 10, the maximum remnant offset is around 0.0026, so the OFDM system is not affected by the frequency offset. Also, when the compensation method of the present invention is applied to an actual case, the compensation is performed excellently.

However, just as the conventional method, the compensation method of the present invention could not compensate the initial DELAY+1 number of symbols for the feedback delay, either. Therefore, the method of the present invention is more effective in a stream-type communication system such as broadcasting, than a packet-type communication system.

As described above, the frequency offset compensation method of the present invention can reduce the power consumption of the frequency offset compensation block and the amount of calculation by minimizing the remnant offset, which is generated when feedback delay occurs during the operation of FFT and offset estimation algorithm and thus the offset-estimated symbol and the actual offset-compensated symbol become different from each other, through feedback control, and also minimizing the accumulation of the remnant offset with respect to the symbols between the estimation periods in a method of extending the period of the offset estimation, which is performed once every or a few symbols into tens of symbols or more.

In addition, the effect of remnant offset caused by the feedback delay can be removed by obtaining the compensation ($cmp_n$) value from the equation 2. Also, since the symbols between the offset estimation periods can be compensated for the offset almost precisely, the accumulation of the offsets in the symbols between the estimation periods, which occurs when the symbols are compensated for their frequency offset with the previous estimation value, can be prevented. The method of the present invention can reduce the power consumption and the amount of calculation by extending the period of the frequency offset estimation.

While the present invention has been described with respect to certain preferred embodiments, it will be apparent to those skilled in the art that various changes and modifications may be made without departing from the scope of the invention as defined in the following claims.

What is claimed is:

1. A delta-predicted frequency offset compensation apparatus applied to a communication system which uses an orthogonal frequency division multiplexing (OFDM) using a plurality of orthogonal sub-carrier waves, comprising:

an offset estimating means for receiving a signal from the communication system and, based on an estimation period and an estimation algorithm, estimating a frequency offset value which is normalized in the sub-carrier waves;

a feedback controlling means for outputting a compensation value for offset compensation through a feedback loop by considering the estimated frequency offset value and a frequency offset delta, the frequency offset delta scaled by a factor involving the estimation period and a delay interval of the feedback loop, the scaled frequency offset delta compensating for a feedback delay introduced by the feedback loop;

an offset compensation signal outputting means for outputting an offset compensation signal having a form of sine and cosine based on the compensation value transmitted from the feedback controlling means;

a phase rotating means for shifting the phase of the signal inputted to the communication system with the offset compensation signal outputted from the offset compensation signal outputting means by a frequency offset corresponding to the input signal to compensate a symbol for the frequency offset; and wherein the feedback controlling means estimates the frequency offset value of the symbol whose offset is not estimated by using a previously estimated offset value, even though the offset value is not estimated by the offset estimating means, and wherein the feedback controlling means outputs the compensation value for frequency offset compensation.

2. The delta-predicted frequency offset compensation apparatus as recited in claim 1, wherein the feedback controlling means obtains the frequency offset delta of the symbol based on an offset delta between the symbol and another symbol having a predetermined time delay or time interval, and uses the obtained frequency offset delta for frequency offset compensation in a circumstance where the frequency offset changes very slowly compared to a symbol rate, and thus the offset delta can be regularly established.

3. The delta-predicted frequency offset compensation apparatus as recited in claim 1, wherein when the frequency offset value estimated from a predetermined symbol is compensated to another symbol that comes after a predetermined time due to the feedback delay, the feedback controlling means reduces the influence from the feedback delay by performing frequency offset compensation in consideration of the frequency offset delta between the symbols involving the feedback delay.

4. The delta-predicted frequency offset compensation apparatus as recited in claim 3, wherein the feedback controlling means performs compensation with the frequency offset delta of a symbol by estimating the frequency offset value for a symbol in a next period based on the compensation value, the frequency offset value estimated for a symbol at a predetermined time and the frequency offset delta of a symbol obtained from the compensation value and the estimated frequency offset value, and comparing the estimated frequency offset value with the estimated frequency offset value that is actually obtained, so that a remnant offset is not accumulated, even though the estimation period is extended.

5. A delta-predicted frequency offset compensation method applied to a delta-predicted frequency offset compensation apparatus, comprising the steps of:

a) estimating a frequency offset value of a communication system based on an estimation period and an estimation algorithm;

b) outputting the compensation value for offset compensation through a feedback loop by considering the estimated frequency offset value and a frequency offset delta scaled by a factor involving the estimation period and a delay interval of the feedback loop, the scaled frequency offset delta compensating for a feedback delay introduced by the feedback loop, wherein the step (b) further comprises:

i) outputting the compensation value to compensate for the frequency offset by using the estimated frequency offset value obtained based on the estimated period;

ii) outputting the compensation value for frequency offset compensation by estimating the frequency offset value of the symbol, which is in a section between adjacent estimation periods, and whose frequency offset value is not estimated, using a previously-estimated frequency offset value; and c) shifting the phase of a signal by a frequency offset corresponding to an input signal of the communication system to compensate a symbol for the frequency offset.

6. The delta-predicted frequency offset compensation method as recited in claim 5, wherein in the step b), the frequency offset delta of the symbol is obtained based on an offset delta between the symbol and another symbol having a predetermined time delay or time interval, and used for frequency offset compensation in a circumstance where the frequency offset changes very slowly compared to a symbol rate, and thus the offset delta can be regularly established.

7. The delta-predicted frequency offset compensation method as recited in claim 5, wherein in the step b), when a frequency offset value estimated from a predetermined symbol is compensated to another symbol that comes after a predetermined time due to the feedback delay, the influence from the feedback delay is reduced by performing frequency offset compensation in consideration of the frequency offset delta between the symbols involving the feedback delay.

8. The delta-predicted frequency offset compensation method as recited in claim 7, wherein in the step b), the frequency offset delta per symbol is compensated by estimating the frequency offset value for a symbol in a next period based on the compensation value, the frequency offset value estimated for a symbol at a predetermined time, and the frequency offset delta of a symbol obtained from the compensation value and the estimated frequency offset value, and comparing the estimated frequency offset value with the estimated frequency offset value that is actually obtained, so that a remnant offset is not accumulated, even though the estimation period is extended.

* * * * *